United States Patent [19]

Mannes

[11] Patent Number: 4,526,354

[45] Date of Patent: Jul. 2, 1985

[54] CLAMPING SYSTEM

[76] Inventor: Paul M. Mannes, 2450 S. Graylog La., New Berlin, Wis. 53151

[21] Appl. No.: 579,303

[22] Filed: Feb. 13, 1984

[51] Int. Cl.$^3$ .............................................. B23Q 1/00

[52] U.S. Cl. ...................................................... 269/93

[58] Field of Search ............................. 269/47, 91-94, 269/239, 900

[56] References Cited

U.S. PATENT DOCUMENTS

| | | | |
|---|---|---|---|
| 2,248,998 | 7/1941 | Johnson et al. . | |
| 2,421,957 | 6/1947 | Mead . | |
| 2,428,111 | 9/1947 | Eldrup | 269/93 |
| 2,537,164 | 1/1951 | Sherr . | |
| 4,046,364 | 9/1977 | Coope et al. . | |
| 4,073,215 | 2/1978 | Coope et al. . | |
| 4,106,785 | 8/1978 | Marten et al. . | |
| 4,429,862 | 2/1984 | Niedecker | 269/47 |

*Primary Examiner*—Robert C. Watson
*Attorney, Agent, or Firm*—Quarles & Brady

[57] ABSTRACT

A clamping system for holding a work piece while it is being worked on by a machine tool is disclosed. In one embodiment there is a base plate having an upper surface that has a locator position in a central region of the surface. A connector is provided that acts between an internal cavity of the work piece and the locator position to limit movement of the work piece along the base plate. Three series of aligned holes in the upper surface of the base plate are provided, each of which extends radially outward from the locator position in a different direction from the other. Three adjustably positionable peripheral clamps are also provided. For each of the clamps, a screw can removably position the clamps at various positions along the series of holes. The clamps can therefore be readily positioned at different radial positions relative to the locator, and can accommodate various sizes of work pieces at a single work station. Other aspects of the invention include structures to reduce marking of the work piece upon clamping, to minimize the likelihood of the clamp working loose during machining, and to provide greater access to the work piece periphery.

1 Claim, 7 Drawing Figures

CLAMPING SYSTEM

A. Field of the Invention

The invention relates to a clamping system for holding a work piece while it is being worked on by a machine tool. More particularly, the invention relates to a clamping system which allows many sizes of work pieces to be worked on at a single work station, which minimizes marking of the work piece by the clamp, which allows for a secure clamping, and which permits simultaneous tool access to the periphery and the side of the work piece while the work piece is clamped.

B. Summary of the Invention

Using a clamp to hold a work piece is of course known in the art. However, with the proliferation of types of machine tools and types of work pieces, work stations which are designed to handle just one size of work piece are often undesirable. While some types of clamps do have means for adjusting to the thickness of a work piece (e.g. the clamp is gradually tightened down onto the item until the top surface is reached), such clamps cannot readily be repositioned to accommodate different lateral diameters of work pieces.

Another problem in the art is that when a standard clamp is used to clamp a work piece, if the top of the work piece is not perfectly flat, the clamp can mark the item. For some types of products, this will diminish or even destroy the value of the item.

Yet another problem in the art is that for those clamps that press onto a peripheral edge of a work piece there is a tendency as the clamp bar is tightened down onto the work piece for the bar to push away from the work piece. If this happens, the work piece may work free during machining. Of course, whatever clamping system is designed must also take into account that the clamp should not prohibit access to the portions of the work piece which the machine tool must act on.

SUMMARY OF THE INVENTION

In one aspect of the invention, there is provided a clamping system for holding a work piece. This system comprises a base plate having an upper surface, a locator position on the base plate upper surface, and a connector acting between an internal portion of the work piece and the locator position to limit movement of the work piece along the upper surface of the base plate. There are also provided two series of aligned attachment holes in the upper surface of the base plate, the series extending radially outward from the locator position in a different direction from each other, and two adjustably positionable peripheral clamps. For each of the clamps, a removable connecting element is provided which acts between the clamp and one of the aligned holes to limit movement of the clamp along the base plate upper surface.

Each of the clamps is also positionable at a second location relative to the base plate by removing the connecting element and then causing it to act between a second of the aligned holes in the same series and the clamp. Thus, the clamps can be readily attached at different radial distances relative to the locator position so as to accommodate different diameter work pieces at a single work station.

In another embodiment of the invention, there is a special clamp for clamping the work piece to a work station. The clamp is of the type where there is a front edge of a clamp bar that projects over a peripheral edge of the work piece, and the clamp bar can be tightened down against spring pressure onto the work piece. The improved clamp has a base member attachable to the work station and a guide post extending upward from the base and through a middle portion of the clamp bar so that the clamp bar is mounted for sliding movement on the guide post with a loose fit connection. There is also a heel post extending upward from the base adjacent the guide post, the heel post having a spherical head at its upper end. A rear portion of the clamp bar rests on the spherical head of the heel post so that the clamp bar can tip sideways to some extent as it is tightened onto the top of a work piece that is not perfectly flat. This tipping action allows the bar to remain parallel to the work piece top surface and therefore minimizes marking of the top surface as the clamp is tightened.

In yet another embodiment, there is another type of clamp for clamping a work piece to a work station. The clamp is again of the type where a front edge of a clamp bar projects over a peripheral edge of the work piece and is tightened down against spring pressure onto the work piece. There is a base attachable to the work station and a guide post extending upward from the base and through a middle portion of the clamp bar. The clamp bar has an elongated slot through which the guide post extends that is suitable to allow the clamp bar to slide up and down on the guide post and also to allow the clamp bar to move transversely to the guide post while the guide post is in the slot.

There is also a heel post extending upwardly from the base, the heel post having a support head at its upper end. A rear portion of the clamp bar rests on the support head, and a cammed undercut on the underside of the clamp bar is provided which slopes downwardly towards the front edge of the clamp bar. Upon the tightening down of the clamp bar on the work piece, the cammed undercut exerts a force on the clamp bar, due to the sloping contact of the undercut against the support head. This force resists to some extent the opposing lateral force exerted by the work piece on the front edge of the clamp bar. The clamp is therefore held more securely (the tendency for the clamp bar to push laterally away from the work piece during tightening is offset).

Yet another embodiment is provided in which there is an internal clamp. This embodiment allows greater access to the periphery of the work piece if the periphery is to be worked on.

Accordingly, the objects of the invention include:

(a) providing a clamping system of the above kind in which the peripheral clamps can be positioned at a number of radical positions so as to allow for the machining of various size work pieces at a single work station;

(b) providing a clamping system of the above kind in which the work piece is firmly held in place;

(c) providing a clamp of the above kind which minimizes marking of the work piece during clamping; and (d) providing a clamping system of the above kind in which the work piece can be machined through its sides and at its periphery at the same time.

Other objects and advantages of the invention will be apparent from the following description of the preferred embodiments. Thus, the scope of the invention is not determined by the preferred embodiments alone. Rather, the claims should be referred to for judging the full scope of the invention.

DESCRIPTION OF THE PREFERRED EMBODIMENTS

Figure 1:
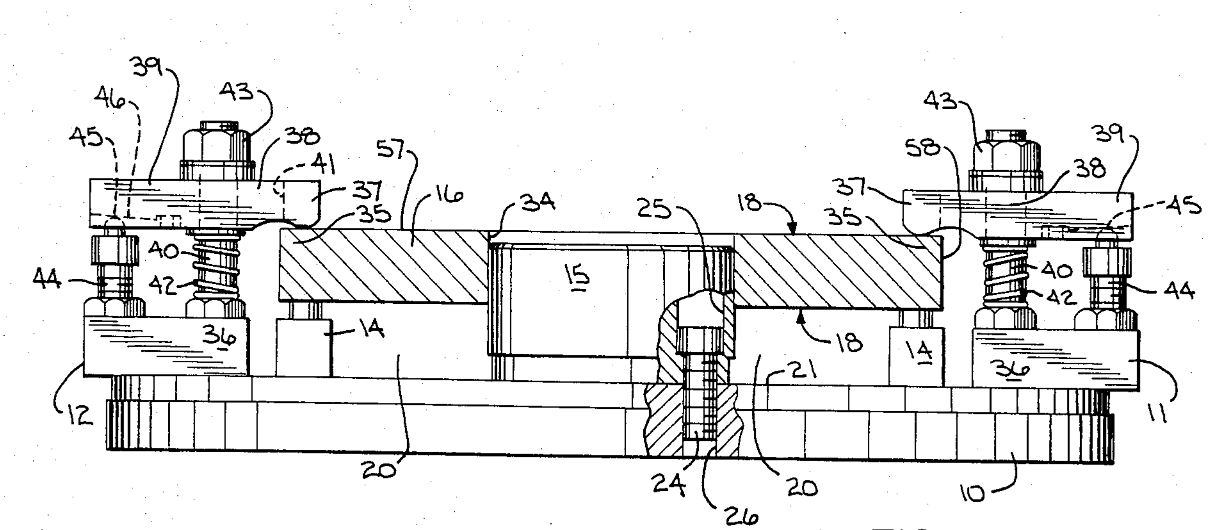
FIG. 1 is a side view, partially in section, of the clamping system of the present invention.
Figure 3:
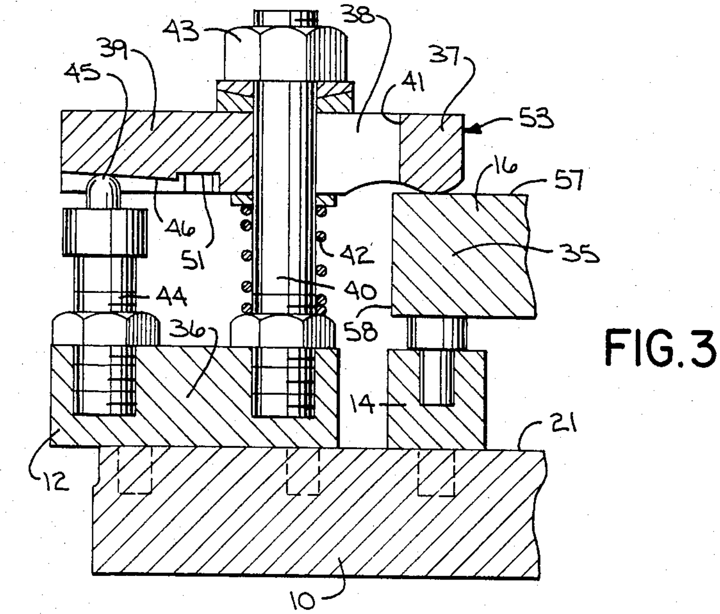
FIG. 3 is an enlarged sectional view of one of the peripheral clamps of claim 1.
Figure 5:
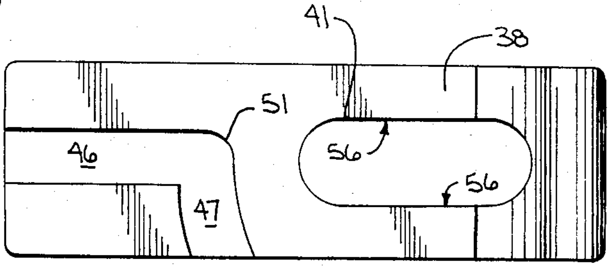
FIG. 5 is a bottom plan view of the clamp bar of FIG. 4.
Figure 4:
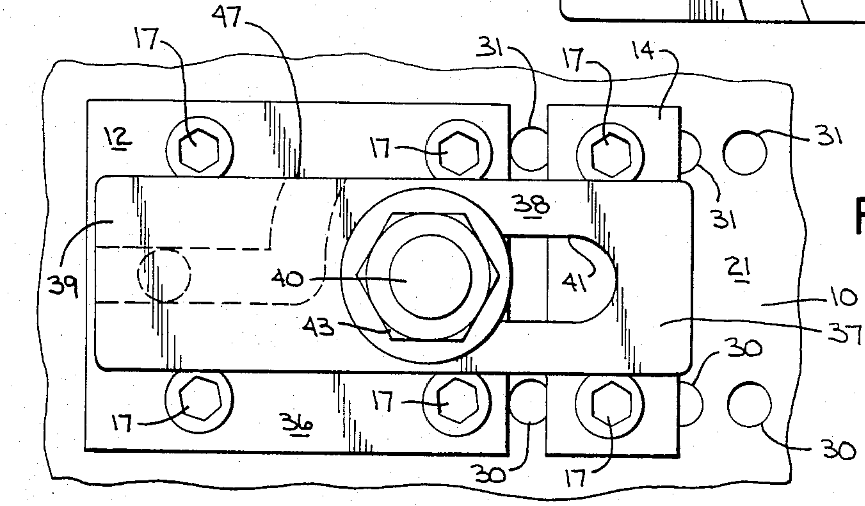
FIG. 4 is an enlarged top plan view of one of the peripheral clamps.
Figure 2:
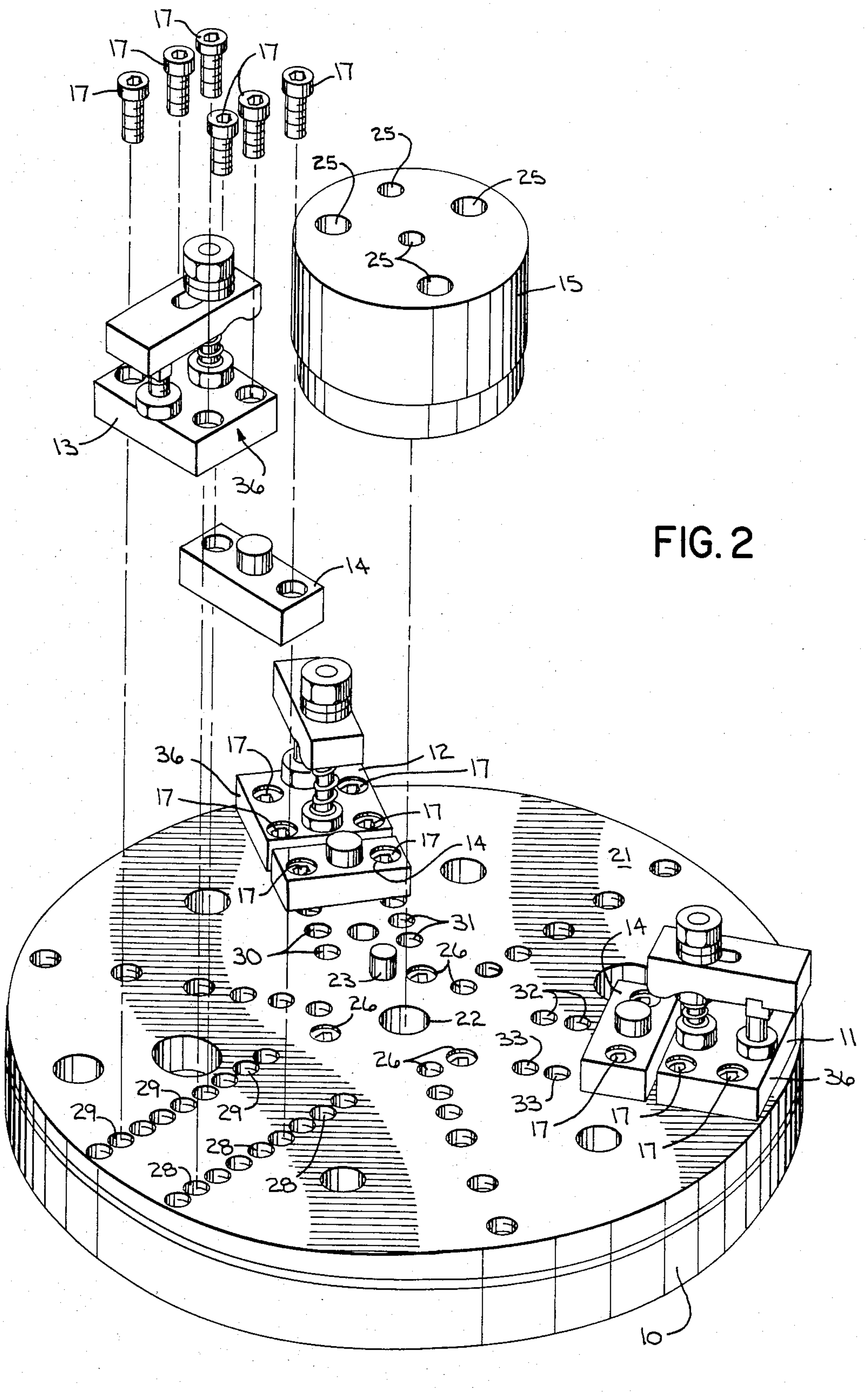
FIG. 2 is a partially exploded perspective view of the clamping system of FIG. 1, with the work piece not shown.

Turning first to FIGS. 1 and 2, there is shown a base plate 10, three peripheral clamps 11, 12 and 13, three rest plates 14, a central locator connector 15, a donut shaped work piece 16, and connector screws 17. In the machine tool application of FIGS. 1-5, it is desired to use these elements to drill a vertical hole sideways through the donut shaped work piece 16 at point 18 in FIG. 1. For this operation, it is desired to fix the donut 16 against movement along the base plate 10, and also to clamp the donut 16 against upward movement away from the base plate 10.

It should also be noted that if one wishes to cut a hole all the way through the work piece 16, one would normally want to suspend the work piece 16 slightly over the base plate 10 so as to create gaps 20 in FIG. 1. When these gaps are present, the drill bit can go all the way through the work piece 16, yet not destroy the base plate 10 after it has done its work. In accordance with the present invention, these goals can be achieved as follows.

The base plate 10 is formed with an upper surface 21. Hole 22 and projecting dowel 23 (see FIG. 2) are provided in a central region of the base plate top surface 21. The central locator connector 15 has on its bottom surface a projecting dowel (not shown) which snugly fits into hole 22. Also, there is a hole (not shown) in this bottom surface that snugly receives dowel 23. The mating of these holes and dowels aligns the locator connector 15 with respect to the base plate 10. Screws 24 (as shown in FIG. 1) are then insertable in holes 25 of the locator connector 15, and then into base plate holes 26, to secure the locator connector 15 to the base plate 10.

As best seen in FIG. 2, there are paired series of aligned attachment holes 28,29,30,31,32,33 which are formed in the top surface 21 of the base plate 10. Each of the pairs extends radially outward from the central region of the base 10 in a different direction. One of the three rest plates 14 is positioned at a radial position along each of the pairs of holes, and is removably affixed to the base plate 10 by inserting two of the screws 17 in two pairs of holes.

The work piece 16 is then placed over the locator connector 15. The edges 35 of the work piece normally rest on the rest plates 14 as shown in FIG. 1. The locator connector 15 is chosen so that its diameter is just slightly smaller than the diameter of an internal cavity 34 of the work piece 16. This arrangement creates the desired gaps 20. At this point, clamps 11, 12 and 13 can be affixed to the base plate 10 along the series of holes, but outward of the rest plates 14, by using four additional connecting screws 17.

The structure of the special peripheral clamps will next be described. These clamps have a base element 36 and a front clamp bar edge 37 projects over the upper outward edge 35 of the work piece 16. There is also a middle clamp bar region 38 and a rear clamp bar end 39. A guide post 40 extends upwardly from the base 36 and through an elongated slot 41 in the middle portion 38 of the clamp bar. The clamp bar is thus mounted for vertical sliding movement on the guide post 40 against the spring pressure provided by spring 42.

Tightening nut 43 is provided over the clamp bar to slowly tighten the clamp bar against the work piece top. In accordance with the present invention, a heel post 44 is provided which also extends upward from the base 36. The heel post 44 has a spherical (or rounded) head 45 at its top. The rear portion 39 of the clamp bar rests on the spherical head 45. Additional features of the clamp include a cammed undercut 46 (see FIG. 3 and FIG. 5) which roughly parallels the longitudinal axis of the clamp bar for a distance, and for a section is almost perpendicular to the axis as at point 47.

When the work piece 16 is clamped, the clamp bar front end 37 extends just over the peripheral edge 35 of the work piece. However, after the clamp is loosened by loosening the nut 41, the spring pressure exerted by spring 42 will cause the clamp bar to move up away from the work piece 16 to some extent. At this point, the clamp can be pushed radially outward from the work piece (without removing screws 17), simply by pushing the front end of the clamp bar such that the spherical head 45 will move along the slot 46, and the guide post 40 will move along the slot 41. Thus, for most work pieces, the clamp can be moved out of the way of the work piece without removing screws 17. One should compare the position of the guide post 40 with respect to the slot 41 in FIG. 2 for clamp 13, with the position of the guide post in FIG. 3 for clamp 12 to see this effect.

As an added feature, once the spherical head 45 reaches point 51 along the undercut on the bottom of the clamp bar, one can then pivot the clamp bar 90°. The spherical head 45 will during this pivoting move along the perpendicular undercut section 47 and eventually out the side of the bottom groove, allowing the front end 37 of the clamp bar to swing parallel to a tangent to the work piece 16. This provides even greater clearance to allow one to remove or insert the work piece easily.

A very desirable feature of the present invention is that as the clamp is being tightened, any tendency of the clamp bar to move laterally away from the work piece is somewhat offset by the sloping undercut 46 contacting the head 45. This is because the sloping undercut is forced against the spherical head 45 when the clamp is pushed in the direction of arrow 53 in FIG. 3. This provides a more secure clamping.

Another especially desirable feature of the present invention relates to the spherical head 45 itself. Often, work pieces will not have entirely flat top surfaces near their peripheral edge 35. If as is conventional the clamp bar cannot tilt sideways during tightening of the clamp to offset this uneven top surface, there is a tendency to mark the top of the work piece. The present invention provides a means of allowing the clamp bar to tilt slightly as it is being tightened if it should encounter a work piece top surface which is not perfectly flat. In this regard, the spherical head 45 allows the rear portion 39 of the clamp bar to roll sideways on the spherical head. Further, the guide post 40 is designed so as to have a diameter which is at least somewhat smaller than the side to side dimension 56 of the slot in 39. This "loose fit" accommodates the side roll permitted by the spherical head.

Figure 6:
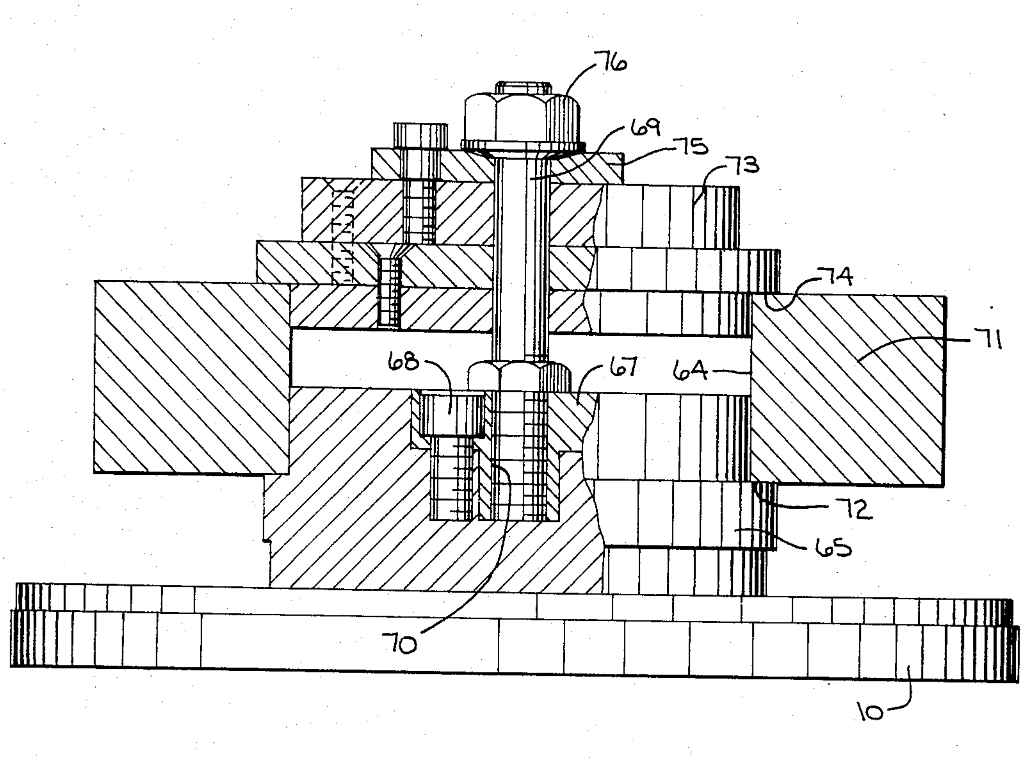
FIG. 6 shows how the present invention can be used in another clamping setup.
Figure 7:
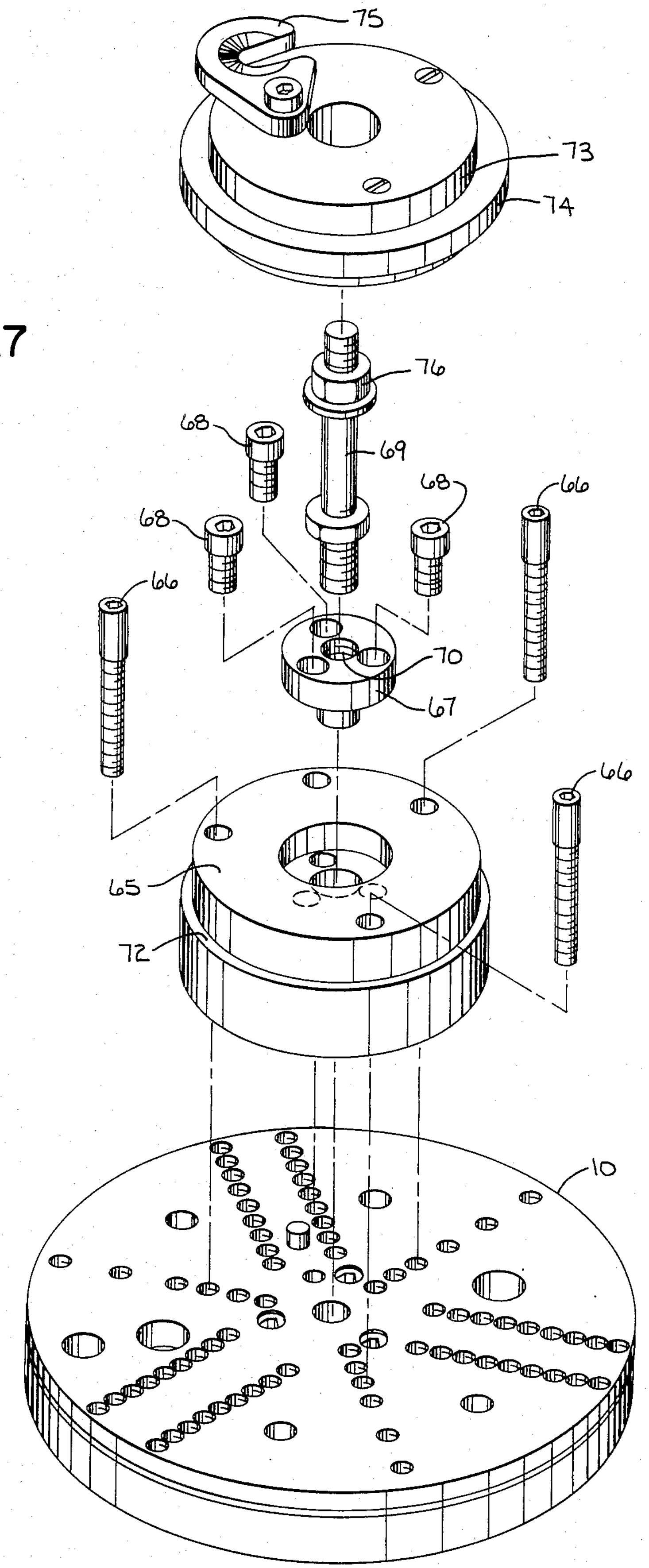
FIG. 7 is an exploded perspective view of the clamping setup of FIG. 6.

The clamping system described above provides machine tool access to a large portion of the top side 57 of the work piece, and a somewhat more limited access to the work piece periphery 58 at locations between the clamps 11, 12 and 13. If instead of using three peripheral clamps, one chooses to use only two (to get greater access to the periphery) one may feel that a more secure clamping is required. The embodiment shown in FIGS. 6 and 7 shows how this can be done. In this embodiment, the base plate 10 is used with a different type of locating connector 65, which is in turn attached by screws 66 to the base plate 10. A t-shaped adapter 67 is affixed in a central counterbore in the top of the locator 65 using screws 68, and a bolt 69 is then screwed into a central hole 70 in the adapter 67.

This embodiment clamps a work piece such as work piece 71 from the top through the interior of the work piece, thus allowing one to use fewer peripheral clamps (e.g. two peripheral clamps can suffice instead of three). Again, the central locator 65 is chosen so as to be of a size just slightly smaller than a central through bore 64 in the work piece. However, this locator is formed with a shoulder 72 which acts as a self contained rest plate for the work piece.

A top clamp 73 is provided having a shoulder 74 that clamps over the top of the work piece 71. A swingable C-ring 75 on the clamp 73 is provided to swing under the head of the nut 76 around the bolt 69, and the nut 76 can then be tightened down. This sandwiches the work piece. While not shown in FIG. 6, the two peripheral clamps can then be attached to the base plate 10 and clamped over the work piece. Thus, this embodiment provides a way of clamping various sizes of work pieces to a base plate while leaving more of the peripheral edge of the work piece exposed.

What has been described thus far are the preferred embodiments of the present invention. It should be obvious to those skilled in the art that various modifications to these embodiments may be made without departing from the spirit of the invention. For example, instead of having three pairs of aligned radially extending holes as shown in FIG. 2, fewer or more series of holes will work. Similarly, the locator position need not be exactly at the center of the base plate, and the connector which affixes the work piece to the locator position need not be a series of dowels, holes, and a cylindrical core. A simple bolt might work for certain work pieces. Thus, the scope of the invention is not to be judged by the preferred embodiments, but rather by the claims which follow.

I claim:

1. In a clamp for clamping a work piece to a work station, of the type wherein a front edge of a clamp bar projects over a peripheral edge of the work piece and is tightened down onto the work piece, the improved clamp comprising:

- a clamp base attachable to the work station;
- a guide post extending upward from the clamp base and through a middle portion of the clamp bar, said clamp bar having an elongated slot through which the guide post extends, the slot being suitable to allow the clamp bar to slide up and down on the guide post and also allow the clamp bar to move transversely with respect to the guide post while the guide post is in the slot;
- a heel post extending upwardly from the clamp base, the heel post having a support head at its upper end;
- a rear portion of said clamp bar resting on the support head; and
- a cammed undercut on the underneath of the clamp bar which slopes downwardly towards the front edge of the clamp bar whereby upon a tightening down of the clamp bar on the work piece, the cammed undercut exerts a force on the clamp bar due to sloping contact of the undercut against the heel post which resists to some extent opposing lateral force exerted by the work piece on the front edge of the clamp bar.

* * * * *